US011954145B2

(12) United States Patent
Rao et al.

(10) Patent No.: US 11,954,145 B2
(45) Date of Patent: Apr. 9, 2024

(54) METHODS, SYSTEMS, AND MEDIA FOR IMAGE SEARCHING

(71) Applicant: HUAWEI TECHNOLOGIES CO., LTD., Gangdong (CN)

(72) Inventors: Varshanth Ravindra Rao, North York (CA); Md Ibrahim Khalil, Toronto (CA); Peng Dai, Markham (CA); Juwei Lu, North York (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 320 days.

(21) Appl. No.: 17/354,786

(22) Filed: Jun. 22, 2021

(65) Prior Publication Data

US 2022/0405322 A1 Dec. 22, 2022

(51) Int. Cl.
*G06F 16/53* (2019.01)
*G06F 16/51* (2019.01)
*G06F 16/55* (2019.01)
*G06F 16/583* (2019.01)
*G06V 10/74* (2022.01)

(52) U.S. Cl.
CPC ............ *G06F 16/55* (2019.01); *G06F 16/51* (2019.01); *G06F 16/53* (2019.01); *G06F 16/583* (2019.01); *G06V 10/74* (2022.01)

(58) Field of Classification Search
None
See application file for complete search history.

(56) References Cited

U.S. PATENT DOCUMENTS

| 10,915,798 | B1 | 2/2021 | Zhang et al. | |
|---|---|---|---|---|
| 2010/0125568 | A1* | 5/2010 | van Zwol | G06V 10/40 707/E17.017 |
| 2011/0176737 | A1* | 7/2011 | Mass | G06F 16/258 382/220 |
| 2011/0191336 | A1* | 8/2011 | Wang | G06F 16/583 707/E17.02 |

(Continued)

FOREIGN PATENT DOCUMENTS

| CA | 2871512 A1 * 10/2013 ....... G06F 17/30256 |
|---|---|
| CN | 111522996 A  8/2020 |

(Continued)

*Primary Examiner* — Bernard Krasnic
(74) *Attorney, Agent, or Firm* — HUAWEI TECHNOLOGIES CO., LTD.

(57) ABSTRACT

Methods, systems, and media for image searching are described. Images comprising one query image and a plurality of candidate images are received. For each candidate image, a first model similarity measure from an output of a first model configured for scene classification to perceive scenes in the images is determined. Further, for each candidate image of the plurality of candidate images, a second model similarity measure from the output of a second model configured for attribute classification to perceive attributes in the images is determined. For each candidate image of the plurality of candidate images, a similarity agglomerate index of a weighted aggregate of the first model similarity measure and the second model similarity measure is computed. The plurality of candidate images based on the respective similarity agglomerate index of each candidate image are ranked and a first ranked candidate images corresponding to the searched images are generated.

15 Claims, 6 Drawing Sheets

(56) References Cited

U.S. PATENT DOCUMENTS

| | | | |
|---|---|---|---|
| 2012/0203764 A1 | 8/2012 | Wood et al. | |
| 2012/0233159 A1* | 9/2012 | Datta | G06F 16/24578 707/E17.014 |
| 2020/0184278 A1 | 6/2020 | Zadeh et al. | |
| 2021/0049202 A1* | 2/2021 | Liu | G06N 3/08 |

FOREIGN PATENT DOCUMENTS

| | | | |
|---|---|---|---|
| JP | 2020061147 A | 4/2020 | |
| WO | WO-2014107193 A1 * | 7/2014 | G06F 17/30038 |
| WO | 2019011936 A1 | 1/2019 | |
| WO | WO-2020092093 A1 * | 5/2020 | G06F 16/532 |

* cited by examiner

METHODS, SYSTEMS, AND MEDIA FOR IMAGE SEARCHING

TECHNICAL FIELD

The present disclosure relates to image processing, in particular methods, systems, and media for image searching.

BACKGROUND

Users who view images have limited options for searching the content of the images and finding similar images. Further, the number of images in a repository (e.g., online or offline) is growing, and images are becoming a core source of data for several downstream applications, including automatic captioning, similar content suggestions, etc. Conventional methods for image searching may not be satisfactory. For example, searching a large image repository manually may be time-consuming.

Conventional search algorithms based on a keyword query criterion may be inaccurate and computationally expensive. The keyword query criterion may use text to describe and find similar images. In other words, the keyword query criterion involves associating images with a semantic concept based on the content of the images. The content may be objective, such as describing a specific object in the image, or subjective, such as describing the image as scary or funny.

Accordingly, it would be desirable to provide a solution for image searching based on query images.

SUMMARY

The present disclosure describes methods, systems, and media for image searching. In particular, the methods, systems, and media rank a plurality of candidate images based on similarity to at least one query image. The methods may use four model similarity measures applied to outputs of four models to rank the plurality of the candidate images. Example embodiments describe methods that rank the candidate images based on a weighted aggregate of one or more model similarity measures. Example embodiments describe methods that rank the candidate images in stages. One or more similarity measures are applied at every stage, where every stage ranks a subset of the candidate images. Further, example embodiments describe an image searching method for ranking candidate videos based on similarity to a query image. Further, example embodiments describe a video searching method for ranking candidate videos based of similarity to a query video. The methods disclosed herein provide a content-aware image searching that ascertains objects and relationships among the objects. Therefore, when image searching, the methods search for semantically similar objects such as being the same object, in a similar scene, at a similar position. Further, the methods of image searching enable versatility, making the methods configurable for adding more similarity measures to rank candidate images.

In accordance with a first aspect, the present disclosure provides a method for image searching for images comprising at least one query image and a plurality of candidate images by ranking the plurality of candidate images based on similarity to the at least one query image. The method includes determining, for each candidate image of the plurality of candidate images, a first model similarity measure from an output of a first model configured for scene classification to perceive scenes in the images. The first model similarity measure is measured between each candidate image and the at least one query image. Further, the method determines, for each candidate image of the plurality of candidate images, a second model similarity measure from the output of a second model configured for attribute classification to perceive attributes in the images. The second model similarity measure is measured between each candidate image and the at least one query image. Afterwards, the method obtains, for each candidate image of the plurality of candidate images, a similarity agglomerate index of a weighted aggregate of the first model similarity measure and the second model similarity measure. Finally, the method ranks the plurality of candidate images based on the respective similarity agglomerate index of each candidate image and generates a first ranked candidate images corresponding to the searched images.

In an example of the first aspect, the method further comprises determining, for each candidate image of a subset of the first ranked candidate images, a third model similarity measure from the output of a third model configured for object detection. The third model similarity measure is measured between each candidate image of the subset of the first ranked candidate images and the at least one query image. The method further ranks the subset of the first ranked candidate images based on the respective third model similarity measure of each candidate image of the subset of the first ranked candidate images and generates a second ranked candidate images corresponding to the searched images.

In some examples of the first aspect, the method further comprises determining, for each candidate image of a subset of the second ranked candidate images, a fourth model similarity measure from the output of a fourth model configured for computing image statistics. The fourth model similarity measure is measured between each candidate image of the subset of the second ranked candidate images and the at least one query image. The method also ranks the subset of the second ranked candidate images based on the respective fourth model similarity measure and generates a final ranked candidate images corresponding to the searched images.

In some examples of the first aspect, the fourth model is configured for computing the image statistics between the at least one query image and each candidate image of the subset of second ranked candidate images by transforming the at least one query image and each candidate image of the subset of the second ranked candidate images into at least one of a fixed length vector, histogram, and pixel values to generate at least one transformed query image and transformed candidate images. Further the method obtains at least one of cosine similarity, hamming distance, $L_0$ distance, $L_1$ distance, and $L_2$ distance between the at least one transformed query image and each transformed candidate images.

In some examples of the first aspect, the first model or the second model generates a classification confidence value for each class in the images. The first model similarity measure or the second model similarity measure is determined by the following equation $$\text{Similarity measure} = \frac{\sum_{class \in \bigcap(A,B)} C_{argument}(\bigcap(A, B))}{\sum_{class \in \bigcup(A,B)} C_{max}(\bigcup(A, B))}$$

where A and B are lists of the classes with respective classification confidence values in the at least one query image and each candidate image, respectively. $\cap(A, B)$ is a class intersection list between A and B, $\cap(A, B)$ comprising common classes between A and B. $\cup(A, B)$ is a class union list between A and B, $\cup(A, B)$ comprising unique classes of A and B. $C_{argument}$ is the confidence value of one of the classes in the intersection list or the union list, wherein argument is a criterion of a minimum (min), a maximum (max), or an average (ave) confidence value of the one of the classes.

In some examples of the first aspect, the first model or the second model generates a list of classes in the images. The first model similarity measure or the second model similarity measure is determined as in the following equation $$\text{Similarity measure} = \frac{\# \cap (A, B)}{\# \cup (A, B)}$$

where A and B are lists of classes in the at least one query image and each candidate image, respectively, $\#\cap(A, B)$ is a number of classes in a class intersection list between A and B, $\#\cap(A, B)$ comprising common classes between A and B, and $\#\cup(A, B)$ is a number of classes in a class union list between A and B, $\#\cup(A, B)$ comprising unique classes in A and B.

In some examples of the first aspect, the third model configured for object detection comprises detecting objects in the image, generating, for each object, an object label and a location, and obtaining, for each object, a relative area measurement as in the following equation $$\text{Relative Area}_{object} = \frac{\text{Area of object}}{\text{Area of image}}$$

where Area of object is a number of pixels represented by each object, and Area of image is a number of pixels of the image the object is detected in. Further, the method determines the third model similarity measure as $$\text{Third model similarity measure} = \frac{\sum_{object\ label \in \cap(A,B)} R_{argument}(\cap(A, B))}{\sum_{object\ label \in \cup(A,B)} R_{max}(\cup(A, B))}$$

where A and B are lists of object labels with respective relative area values in the at least one query image and each candidate image of the subset of the first ranked candidate images, respectively, $\cap(A, B)$ is an object label intersection list between A and B, $\cap(A, B)$ comprising common object labels between A and B, $\cup(A, B)$ is an object label union list between A and B, $\cup(A, B)$ comprising unique object labels in A and B, $R_{argument}$ is the relative area values of one of object labels in the object label intersection list or the object label union list, wherein argument is a criterion of a minimum (min), a maximum (max), and an average (ave) relative area value of the one of object labels.

In some examples of the first aspect, when A or B has more than one object of the one of object labels in the object label intersection list or object label union list, the method computes $R_{argument}$ by determining $R_{argument}$ for every pair of the one of object labels in A and B, the pair being the one of object label in A and the one of object label in B. Further, the method includes the relative area values of the one object label in A or B with no respective pair if $R_{argument}$ is computed for $\cup(A, B)$ and excludes the relative area values of the one object label A or B with no respective pair if $R_{argument}$ is computed for $\cap(A, B)$.

In some examples of the first aspect, computing $R_{argument}$ further comprises sorting the one of the object labels in A and B based on relative area values and ranking the one of the object labels in the sorted A and B.

In accordance with a second aspect, the present disclosure provides a method for video searching for videos comprising at least one query video and a plurality of candidate videos by ranking the plurality of candidate videos based on similarity to the at least one query video. The method includes representing the at least one query video as Q query video frame images using a frame sampling method. Further, the method applies the frame sampling method to each candidate video to represent each candidate video as candidate video frame images. The method then processes a sliding window, the sliding window being Q frames of the candidate video frame images. When processing the sliding window, the method computes a preliminary video similarity agglomerate index between each frame image of the sliding window and a corresponding query video frame image. The method then computes a sliding window agglomerate index from the preliminary video similarity agglomerate indexes of the sliding window. For each candidate video, the sliding window agglomerate indexes are aggregated to generate a final agglomerate index, which are ranked based on their similarity to the at least one query video.

In accordance with a third aspect, the present disclosure provides a system for image searching for images comprising at least one query image and a plurality of candidate images by ranking the plurality of candidate images based on similarity to the at least one query image. The system comprises a memory storing instructions and a processor coupled to the memory and configured to execute the instructions to determine, for each candidate image of the plurality of candidate images, a first model similarity measure from an output of a first model configured for scene classification to perceive scenes in the images. The first model similarity measure is measured between each candidate image and the at least one query image. The system further comprises instructions, when executed, determine, for each candidate image of the plurality of candidate images, a second model similarity measure from the output of a second model configured for attribute classification to perceive attributes in the images. The second model similarity measure is measured between each candidate image and the at least one query image. Afterwards, the system obtains, for each candidate image of the plurality of candidate images, a similarity agglomerate index of a weighted aggregate of the first model similarity measure and the second model similarity measure. Finally, the system further comprises instructions, when executed, rank the plurality of candidate images based on the respective similarity agglomerate index of each candidate image and generates a first ranked candidate images corresponding to the searched images.

In an example of the third aspect, the system further comprises instructions, when executed, determine, for each candidate image of a subset of the first ranked candidate images, a third model similarity measure from the output of a third model configured for object detection. The third model similarity measure is measured between each candidate image of the subset of the first ranked candidate images and the at least one query image. The system further comprises instructions, when executed, rank the subset of the first ranked candidate images based on the respective third model similarity measure of each candidate image of the subset of the first ranked candidate images and generates a second ranked candidate images corresponding to the searched images.

In some examples of the third aspect, the system further comprises instructions, when executed, determine, for each candidate image of a subset of the second ranked candidate images, a fourth model similarity measure from the output of a fourth model configured for computing image statistics. The fourth model similarity measure is measured between each candidate image of the subset of the second ranked candidate images and the at least one query image. The system also comprises instructions, when executed, rank the subset of the second ranked candidate images based on the respective fourth model similarity measure and generates a final ranked candidate images corresponding to the searched images.

In some examples of the third aspect, the fourth model is configured for computing the image statistics between the at least one query image and each candidate image of the subset of second ranked candidate images by transforming the at least one query image and each candidate image of the subset of the second ranked candidate images into at least one of a fixed length vector, histogram, and pixel values to generate at least one transformed query image and transformed candidate images. Further the system obtains at least one of cosine similarity, hamming distance, $L_0$ distance, $L_1$ distance, and $L_2$ distance between the at least one transformed query image and each transformed candidate images.

In some examples of the third aspect, the first model or the second model generates a classification confidence value for each class in the images. The first model similarity measure or the second model similarity measure is determined by the following equation $$\text{Similarity measure} = \frac{\sum_{class \in \cap(A,B)} C_{argument}(\cap(A, B))}{\sum_{class \in \cup(A,B)} C_{max}(\cup(A, B))}$$

where A and B are lists of the classes with respective classification confidence values in the at least one query image and each candidate image, respectively. ∩(A, B) is a class intersection list between A and B, ∩(A, B) comprising common classes between A and B. ∪(A, B) is a class union list between A and B, ∪(A, B) comprising unique classes of A and B. $C_{argument}$ is the confidence value of one of the classes in the intersection list or the union list, wherein argument is a criterion of a minimum (min), a maximum (max), or an average (ave) confidence value of the one of the classes.

In some examples of the third aspect, the first model or the second model generates a list of classes in the images. The first model similarity measure or the second model similarity measure is determined as in the following equation $$\text{Similarity measure} = \frac{\# \cap (A, B)}{\# \cup (A, B)}$$

where A and B are lists of classes in the at least one query image and each candidate image, respectively, #∩(A, B) is a number of classes in a class intersection list between A and B, #∩(A, B) comprising common classes between A and B, and #∪(A, B) is a number of classes in a class union list between A and B, #∪(A, B) comprising unique classes in A and B.

In some examples of the third aspect, the third model configured for object detection comprises detecting objects in the image, generating, for each object, an object label and a location, and obtaining, for each object, a relative area measurement as in the following equation $$\text{Relative Area}_{object} = \frac{\text{Area of object}}{\text{Area of image}}$$

where Area of object is a number of pixels represented by each object, and Area of image is a number of pixels of the image the object is detected in. Further, the system determines the third model similarity measure as $$\text{Third model similarity measure} = \frac{\sum_{object\ label \in \cap(A,B)} R_{argument}(\cap(A, B))}{\sum_{object\ label \in \cup(A,B)} R_{max}(\cup(A, B))}$$

where A and B are lists of object labels with respective relative area values in the at least one query image and each candidate image of the subset of the first ranked candidate images, respectively, ∩(A, B) is an object label intersection list between A and B, ∩(A, B) comprising common object labels between A and B, ∪(A, B) is an object label union list between A and B, ∪(A, B) comprising unique object labels in A and B, $R_{argument}$ is the relative area values of one of object labels in the object label intersection list or the object label union list, wherein argument is a criterion of a minimum (min), a maximum (max), and an average (ave) relative area value of the one of object labels.

In some examples of the third aspect, when A or B has more than one object of the one of object labels in the object label intersection list or object label union list, the system computes $R_{argument}$ by determining $R_{argument}$ for every pair of the one of object labels in A and B, the pair being the one of object label in A and the one of object label in B. Further, the system includes the relative area values of the one object label in A or B with no respective pair if $R_{argument}$ is computed for ∪(A, B) and excludes the relative area values of the one object label A or B with no respective pair if $R_{argument}$ is computed for ∩(A, B).

In some examples of the third aspect, computing $R_{argument}$ further comprises sorting the one of the object labels in A and B based on relative area values and ranking the one of the object labels in the sorted A and B.

In some examples of the third aspect, the present disclosure provides a system for video searching for videos comprising at least one query video and a plurality of candidate videos by ranking the plurality of candidate videos based on similarity to the at least one query video. The system comprises a memory storing instructions and a processor coupled to the memory and configured to execute the instructions to represent the at least one query video as Q query video frame images using a frame sampling method. Further, the system further comprises instructions, when executed, apply the frame sampling method to each candidate video to represent each candidate video as candidate video frame images. The system then processes a sliding window, the sliding window being Q frames of the candidate video frame images. When processing the sliding window, the system computes a preliminary video similarity agglomerate index between each frame image of the sliding window and a corresponding query video frame image. The system then computes a sliding window agglomerate index from the preliminary video similarity agglomerate indexes of the sliding window. For each candidate video, the sliding window agglomerate indexes are aggregated to generate a final agglomerate index, which are ranked based on their similarity to the at least one query video.

In accordance with a fourth aspect, the present disclosure provides a processor-readable medium having tangibly stored thereon instruction that, when executed by a processor device, cause the processor device to perform any of the method steps described above.

BRIEF DESCRIPTION OF THE DRAWINGS

Similar reference numerals may have been used in different figures to denote similar components.

DESCRIPTION OF EXAMPLE EMBODIMENTS

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout. Separate boxes or illustrated separation of functional elements or modules of illustrated systems and devices does not necessarily require physical separation of such functions or modules, as communication between such elements can occur by way of messaging, function calls, shared memory space, and so on, without any such physical separation. As such, functions or modules need not be implemented in physically or logically separated platforms, although they are illustrated separately for ease of explanation herein. Different devices can have different designs. While some devices implement some functions in fixed-function hardware, other devices can implement such functions in a programmable processor with code obtained from a machine-readable medium.

Figure 1:
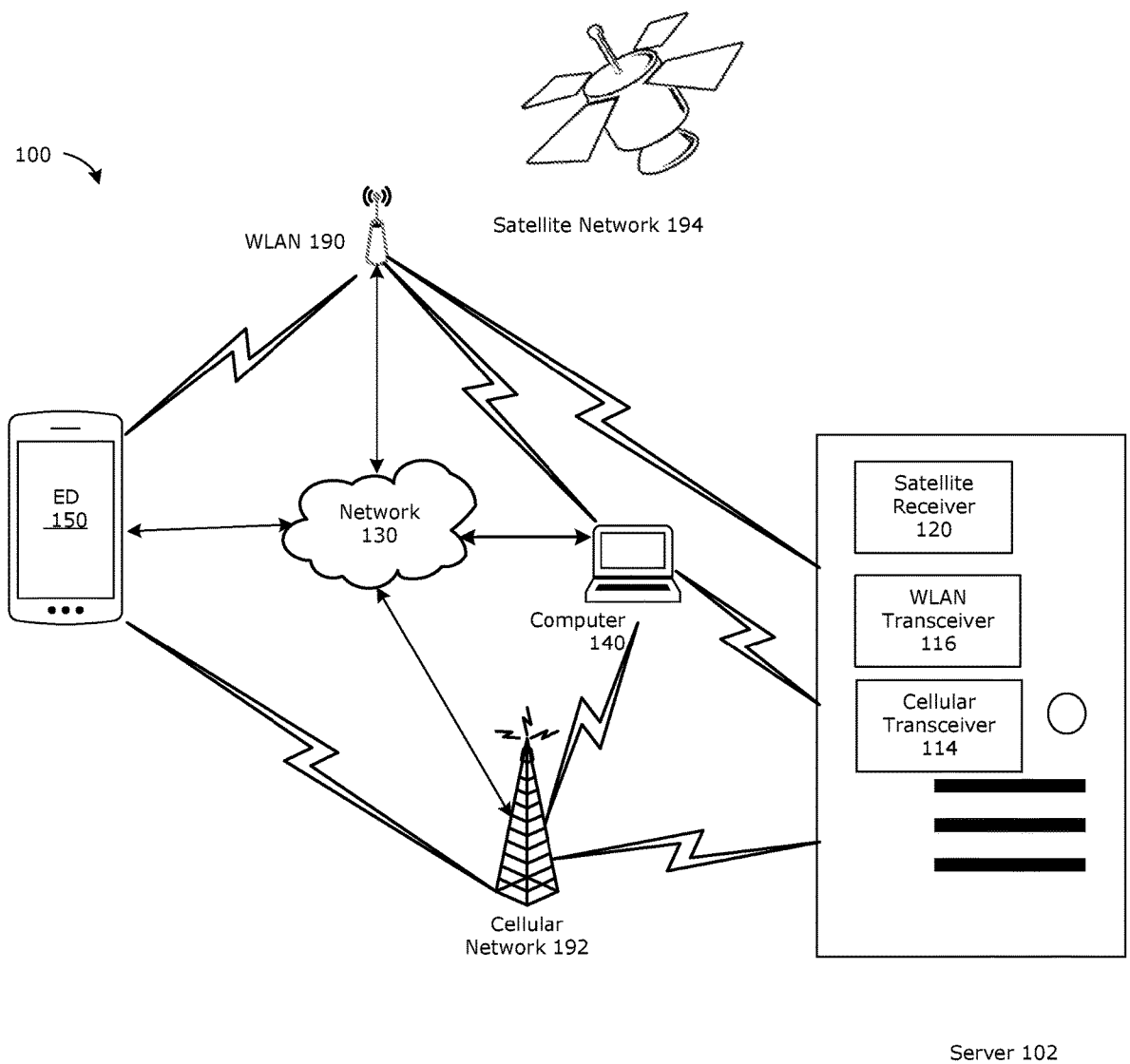
FIG. 1 is a schematic diagram illustrating a communication system suitable for use with an electronic device in accordance with an example embodiment of the present application.

FIG. 1 is a schematic diagram illustrating an example communication system 100 suitable for operating a server 102 and/or an electronic device (ED) 150 in accordance with examples of the present disclosure. As described in detail below, the communication system 100 can include multiple different types of communication networks in communication with the server 102, and each of these communication networks can each be connected directly or indirectly to a further network 130 such as the Internet, enabling one or more services to be accessed through the network 130. In some applications, the service(s) may be stored within a server 102.

In example embodiments, the communication system 100 may include the ED 150, which is associated with a user who owns the ED 150.

The server 102 in this example comprises a satellite receiver 120 for receiving satellite signals from a satellite network 194. The satellite network 194 may comprise a plurality of satellites that are part of a global or regional satellite navigation system, for example. In some embodiments, the server 102 may have a satellite transceiver capable of both receiving and sending satellite signals instead of the satellite receiver 120 that can only receive satellite signals.

The server 102 also comprises one or more wireless transceivers for exchanging at least data communications. The wireless transceivers in this example comprise at least a cellular transceiver 114 for communicating with a plurality of different radio access networks (RAN), such as a cellular network 192. The wireless transceivers may also comprise a wireless local area network (WLAN) transceiver 116 for communicating with a WLAN 190 via a WLAN access point (AP). The WLAN 190 may comprise a Wi-Fi wireless network that conforms to IEEE 802.11x standards (sometimes referred to as Wi-Fi®). Other communication protocols may be used for the WLAN 190 in other embodiments.

In the illustrated embodiment, the server 102 may wirelessly interface with the ED 150 directly or indirectly to communicate with each other through network 130. In some examples, one or more of the functions described below in respect of the server 102 could be performed at the ED 150 and vice versa, such as implementing various components of an image searching system. In some examples, data stored at the server 102 may be stored additionally or alternatively at the ED 150. For example, some resources or data libraries (e.g., image repositories) may be stored at the server 102, and the ED 150 may access the resources or data libraries stored at the server 102 via the network 130. In other examples, the data libraries may be stored at the ED 150, such as in one or more non-transitory memories internal to the ED 150, and the ED 150 may access the resources or data libraries on the internal non-transitory memories.

The server 102 may be any components capable of performing image searching, and communicating with the ED 150. In some examples, the ED 150 could be a mobile or stationary device smartphone, personal computer such as a desktop or laptop, a smart TV, tablet devices, other servers, or any other suitably enabled device.

Figure 2:
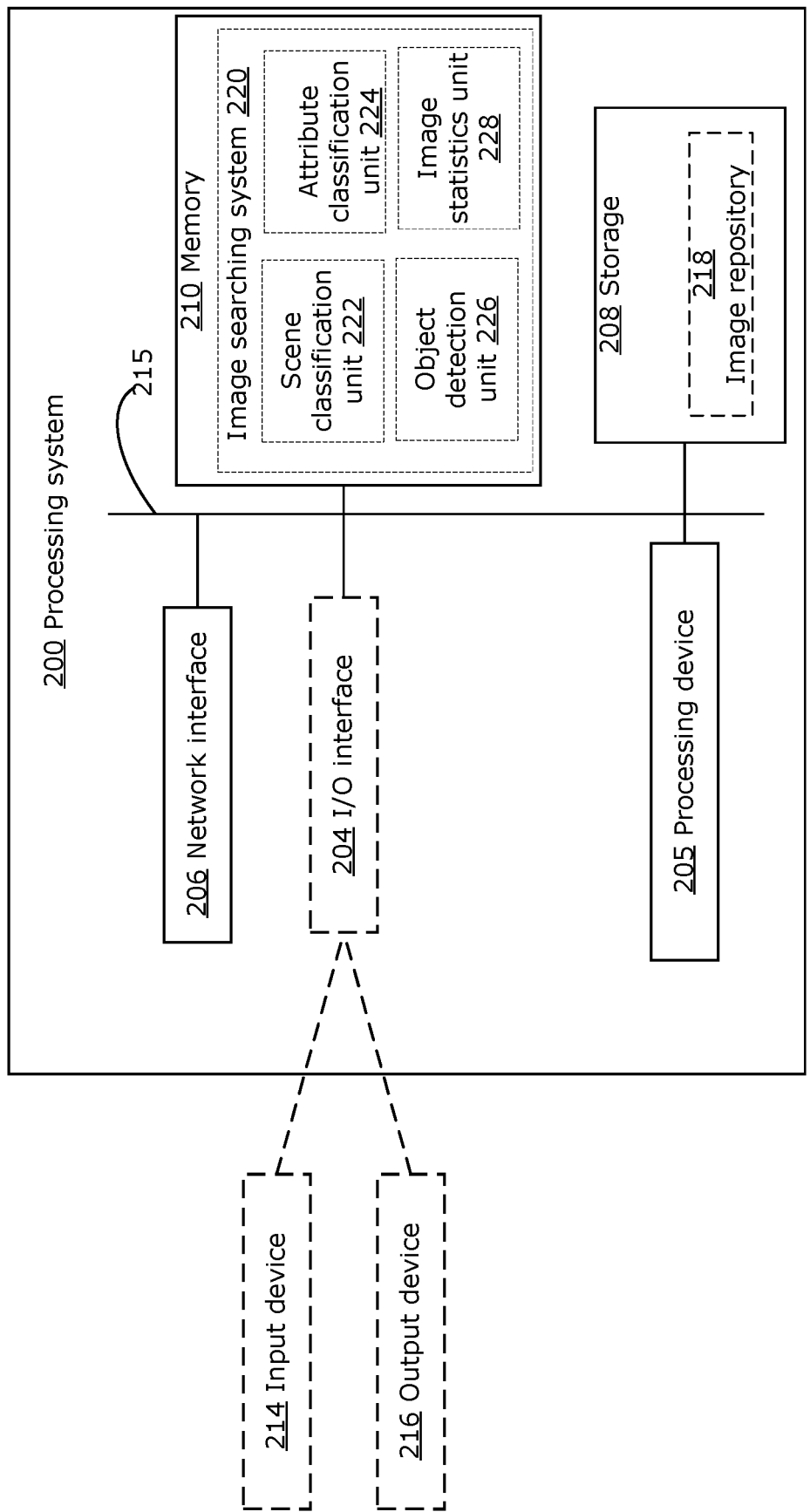
FIG. 2 is a block diagram illustrating an example processing system that can be employed to implement the methods, systems, and media disclosed herein in accordance with an example embodiment of the present application.

FIG. 2 is a block diagram of a processing system, which may be used to implement embodiments disclosed herein. The processing system 200 described below, or variations thereof, may be used to implement the server 102 or the ED 150 or any components of the communication system 100. Other processing systems may be suitable for implementing embodiments described in the present disclosure and may include components different from those discussed below. Although FIG. 2 shows a single instance of each component, there may be multiple instances of each component in the processing system 200 (e.g., when the processing system 200 is used to implement the server 102 or the ED 150).

The processing system 200 may include one or more processing devices 205, such as a processor, a microprocessor, a graphics processing unit (GPU), a tensor processing unit (TPU), an application-specific integrated circuit (ASIC), a field-programmable gate array (FPGA), a dedicated logic circuitry, or combinations thereof. The processing system 200 may optionally include one or more input/output (I/O) interfaces 204, to enable interfacing with one or more optional input devices 214 and/or optional output devices 216. The processing system 200 may include one or more network interfaces 206 for wired or wireless communication with the network 130 or peer-to-peer communication with other processing systems 200. The network interface(s) 206 may include wired links (e.g., Ethernet cable) and/or wireless links (e.g., one or more antennas) for intra-network and/or inter-network communications.

The processing system 200 may also include one or more storage unit(s) 208, which may include a mass storage unit such as a solid-state drive, a hard disk drive, a magnetic disk drive and/or an optical disk drive. In some example embodiments, the storage unit(s) 208 may include an image repository 218 for storing candidate images and candidate videos for ranking. The image repository 218 may store query images and query videos. Although FIG. 2 illustrates the storage unit(s) 208, including the image repository 218 in alternative embodiments, the image repository 218 may be included in one or more remote storage unit(s) that can be accessed remotely via a wireless or a wired network 130.

The processing system 200 may include one or more non-transitory memories 210, which may include a volatile or a non-volatile memory (e.g., a flash memory, a random access memory (RAM), and/or a read-only memory (ROM)). The non-transitory memory(ies) 210 may store instructions for execution by the processing device(s) 205, such as to carry out example methods described in the present disclosure. The memory(ies) 210 may store other software (e.g., instructions for execution by the processing device(s) 205), such as an operating system and other applications/functions. In some embodiments, one or more data sets and/or modules may be provided by an external memory (e.g., an external drive in wired or wireless communication with the processing system 200) or may be provided by a transitory or non-transitory computer-readable medium. Examples of non-transitory computer-readable media include a RAM, a ROM, an erasable programmable ROM (EPROM), an electrically erasable programmable ROM (EEPROM), a flash memory, a CD-ROM, or other portable memory storage. In an embodiment, memory(ies) 210 stores an image searching system 220, which is a software system that includes machine-readable instructions that are stored in the memory(ies) 210 and are executable by the processing device 205.

The image searching system 220 includes a scene classification unit 222, an attribute classification unit 224, an object detection unit 226, and an image statistics unit 228, which are software units (or software subsystems) of the image searching system 220. The scene classification unit 222 may be machine-learning based software unit that implements software of a learned scene classification model to detect scene classes in images, scene classes such as baseball stadium, classroom, park, disco, gym, etc. The attribute classification unit 224 may be machine-learning based software unit that implements software of a learned attribute classification model to detect attribute classes in images, attribute classes such as scary, funny, gloomy, dark, fighting, tense, natural light, competing, etc. The object detection unit 226 may be machine-learning based software unit that implements software of a learned model object detection to detect objects in images, objects such as cars, persons, stop signs, buildings, etc. The image statistics unit 228 may be machine-learning based software unit that implements software of a learned model object detection to compute image statistics such as histogram, transformation into fixed-length vectors, features etc. In example embodiments, each of the aforementioned units 222, 224, 226, and 228 may implement rule-based software rather than machine-learning based software, or a combination of thereof. In example embodiments, each of the aforementioned units 222, 224, 226, and 228 may implement mathematical functions rather than machine-learning based software, rule-based software, or a combination of thereof. Each of the aforementioned units (222, 224, 226, and 228) also implements a respective similarity measure for comparing images.

In other embodiments, the image searching system 220 may implement an algorithm that performs image searching from candidate videos instead of candidate images. In other embodiments, the image searching system 220 may implement an algorithm for video searching based on comparing a query video to a plurality of candidate videos. In some embodiments, the image searching system 220 may be implemented as a single hardware device, such as an application-specific integrated circuit (ASIC), field-programmable gate array (FPGA), or a system on a chip (SoC). The hardware device includes electronic circuits that perform the functions of the units 222, 224, 226, and 228. In other example embodiments, the processing system 200 may be implemented as multiple hardware devices (e.g., multiple ASIC, FPGAs, and/or SoCs). Each hardware device includes electronic circuits that perform the functions of one of the units 222, 224, 226, and 228. Details of the scene classification unit 222, the attribute classification unit 224, object detection unit 226, and image statistics unit 228 are discussed further below.

There may be a bus 215 providing communication among components of the processing system 200, including the processing device(s) 205, optional I/O interface(s) 204, network interface(s) 206, storage unit(s) 208 and/or memory (ies) 210. The bus 215 may be any suitable bus architecture, including, for example, a memory bus, a peripheral bus or a video bus.

In FIG. 2, the optional input device(s) 214 (e.g., a keyboard, a mouse, a microphone, a camera, a touchscreen integrated into a display device which may include a UI and/or a keypad) and optional output device(s) 216 (e.g., a display device which may include a UI, a speaker and/or a printer) are shown as external to the processing system 200. In other examples, one or more of the optional input device(s) 214 and/or the optional output device(s) 216 may be an internal component of the processing system 200. In the case of the ED 150, optional input device(s) 214 may include a display device having a display screen and a user interface (UI) navigation device (for example, a touchscreen input, a mouse or a handheld controller) for allowing a user to interact with items displayed by the display device. The optional output device(s) 216 may also include a display device having a display screen and a user interface (UI) navigation device for displaying generated results on the ED 150.

Known methods perform image searching using an image query criterion instead of a keyword query criterion. Image query criterion involves matching at least one query image to candidate images in the image repository 218 through image similarity measures. The concept of deciding on a similarity between the at least one query image and a candidate image varies widely. Some methods compare the colors of the images. For example, if the at least one query image has a red shoe, the method searches the candidate images for red shoes. Other methods consider landmarks in the at least one query image. For example, if the at least one query image has Eiffel Tower, the method searches the candidate images for Eiffel Tower. These methods do not encapsulate similarity at a granular level. For example, suppose the at least one query image includes Eiffel Tower and a person posing next to Eiffel Tower at a distance. In that case, the aforementioned methods may not capture the relationship between the person, Eiffel Tower, and the distance between the person and Eiffel Tower, which is granular level information. Rather the known methods may only capture the landmark, which is Eiffel Tower. The image searching system 220 with the four units 222, 224, 226, and 228 may be capable of capturing the granular level details of the at least one query image, and search for candidate images with the granular level information.

When a user uses the ED 150 to search for candidate images similar to the at least one query image, it may be unpleasant or inconvenient for the user to receive search results that are irrelevant. The image searching system 220 ranks the candidate images based on their similarity to the at least one query image. Example embodiments describe methods where the at least one query image is a single image. In such example, the image searching system 220 ranks the candidate images based on the similarity of each candidate image with the query image.

In example embodiments, the candidate images are frames of candidate videos. In such example embodiments, the image searching system 220 ranks the candidate videos based on the similarity between the at least one query image and the candidate videos' candidate frame images. In example embodiments, the at least one query images may also be a query video comprising a plurality of query images. Further, the candidate images are frames of candidate videos. In such example embodiments, the image searching system 220 ranks the candidate videos based on the similarity between the candidate videos' candidate frame images and the query video's query frame images.

Figure 3:
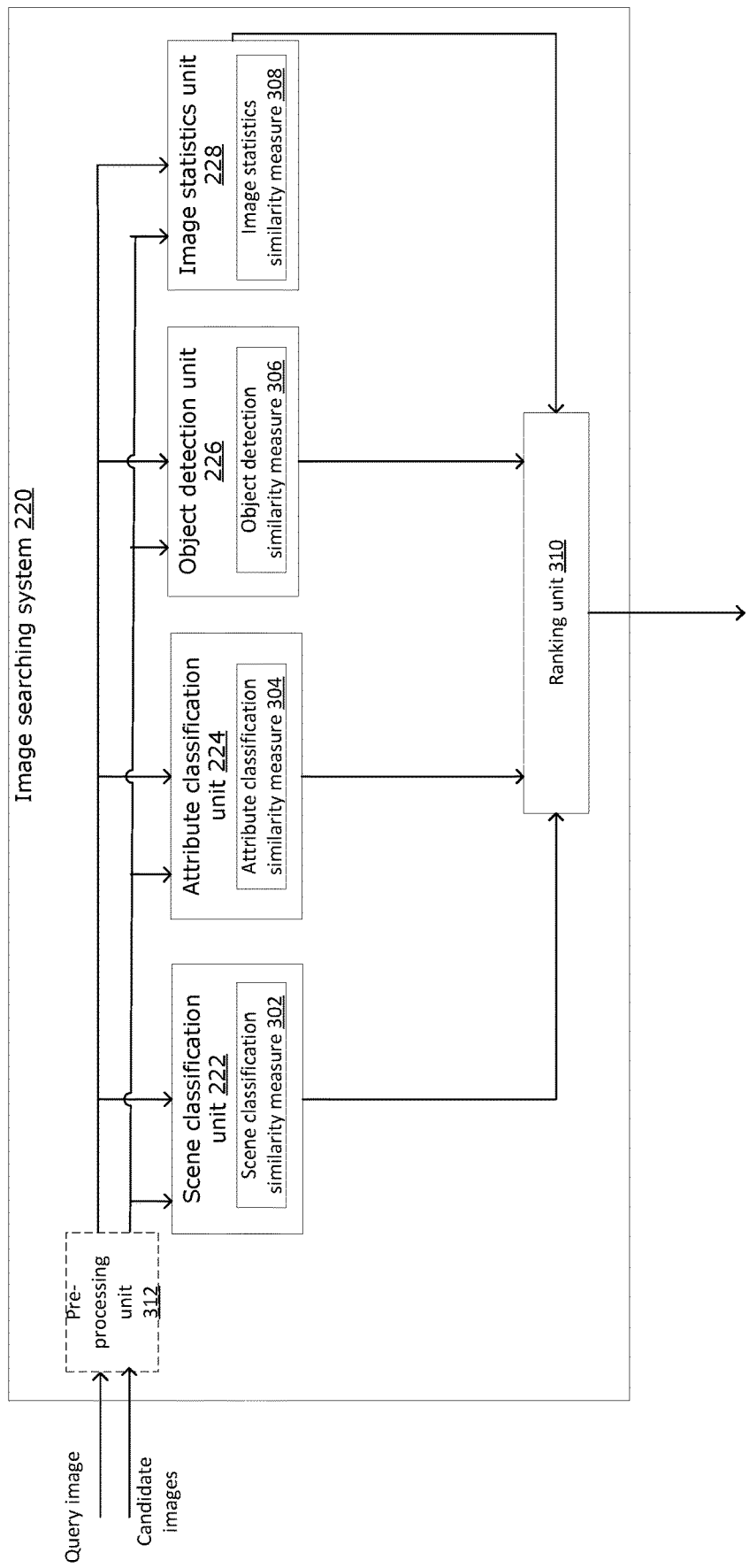
FIG. 3 is a block diagram illustrating an image searching system implementing an image searching method in accordance with an example of the present application embodiment.

FIG. 3 is a block diagram illustrating an image searching system implementing an image searching method. The image searching system 220 receives input data as images. The images comprise at least one query image (referred to, in the singular form, as a query image for simplicity) and a plurality of candidate images (referred to as candidate images for simplicity). The candidate images are received from the image repository 218. The query image may be received from image repository 218 or may be captured by the optional input device 214, using the camera.

The pre-processing unit 312 is an optional unit implementing methods previously known in the art that classify candidate images as relevant or irrelevant to the query image and generate a subset of candidate images for further processing in the image searching system 220. The subset of candidate images includes the relevant candidate images only. The pre-processing unit 312 may implement a machine-learning based model, a rule-based model, a mathematical function, or a combination of thereof to classify candidate images as relevant or irrelevant. The pre-processing unit 312 may use a classifier for feature extraction. Several known classifiers may be used, such as CNN-based image classifier like MultiGrain by Berman et al. (Multi-Grain: a unified image embedding for classes and instances, 2019, https://arxiv.org/abs/1902.05509.pdf), ResNet by He et al. (Deep Residual Learning for Image Recognition, 2015, https://arxiv.org/abs/1512.03385.pdf), EfficientNet by Tan M and Le Q. V. (EfficientNet: Rethinking Model Scaling for Convolutional Neural Networks, 2020, https://arxiv.org/abs/1905.11946.pdf).

The classifier of the pre-processing unit 312 extracts features from all candidate images and stores the extracted features in memory 210. When the image searching system 220 receives a query image, the pre-processing unit 312 extracts the features of the query image. The features of the query image are compared to the features of each candidate image using a pre-processing similarity measure of a distance (e.g. cosine similarity, Euclidean distance, hamming distance, etc.). The candidate images whose pre-processing similarity measures exceed a pre-processing threshold are added to the subset of candidate images for further processing. In example embodiments, the pre-processing unit 312 does not exist. In such a scenario, all the candidate images are further processed in the image searching system 220.

The scene classification unit 222 receives the query image and the candidate images. It is understood that when the image searching system 220 implements the pre-processing unit 312 then the scene classification unit 222 receives the subset of candidate images of relevant candidate images only. The scene classification unit 222 may implement a learned scene classification model using machine learning. In example embodiments, the scene classification model is learned based on deep learning and trained on large-scale datasets. The scene classification model detects scene classes in images such as beach, stadium, gym etc. Example embodiments use machine-learning based approaches for transforming the query image and the candidate images into features. In some example embodiments, machine learning approaches are used to rely on machine learning to extract the features. In other example embodiments, handcrafted features are used to train the scene classification model. Example embodiments describe the scene classification unit 222 implementing a set of rules to generate the scene classification model.

Example embodiments describe the output of the scene classification model as a confidence value of classification for each class in the images (e.g. the query image and the candidate images). In such embodiments, the output of the scene classification model is a list of classes and the respective confidence value of each class. The confidence value may be a probability describing the likelihood of the existence of a class in one of the images. The sum of the confidence values of all classes in each image is equal to 1. For instance, an image may have a shopping mall with a respective confidence value of 0.5, a library with a respective confidence value of 0.03, and a bookstore with a respective confidence value of 0.2. In other words, the scene classification model is 50% certain that the image is of a shopping mall, 3% certain that the image is of a library, and 20% certain that the image is of a bookstore.

Example embodiments describe the output of the scene classification unit 222 as a list of classes detected in the images. For instance, the output may be list of shopping mall, library, and bookstore.

The attribute classification unit 224 receives the query image and the candidate images. The attribute classification unit 224 may implement a learned attribute classification model using machine learning. In example embodiments, the attribute classification model is learned based on deep learning and trained on large-scale datasets. The attribute classification model detects attribute classes in images such as scary, funny, gloomy, dark, fighting, tense, natural light, competing, etc. Example embodiments use machine-learning based approaches for transforming the query image and the candidate images into features. In some example embodiments, machine learning approaches are used to rely on machine learning to extract the features. In other example embodiments, handcrafted features are used to train the attribute classification model. Example embodiments describe the attribute classification unit 224 implementing a set of rules to generate the attribute classification model.

Similar to the output of the scene classification unit 222, example embodiments describe the output of the attribute classification model as a classification confidence value for each class in the images (query image and candidate images). Also, example embodiments describe the output of the attribute classification model as a list of classes (attribute classes) detected in the query image and candidate images.

Scene classification similarity measure 302 and attribute classification similarity measure 304 determine similarity measure between the query image and each candidate image based on scene classification model and attribute classification model, respectively.

Example embodiments describe the scene classification unit 222 and/or the attribute classification unit 224 outputting a list of classes with each class's respective confidence values. In such embodiments, the similarity measure, scene classification similarity measure 302 or attribute classification similarity measure 304, determines similarity based on confidence weighted intersection over union. The similarity measure is computed as follows:

$$\text{Similarity measure} = \frac{\sum_{class \in \cap(A,B)} C_{argument}\left(\bigcap(A, B)\right)}{\sum_{class \in \cup(A,B)} C_{max}\left(\bigcup(A, B)\right)} \quad (1)$$

where A and B are lists of classes with each class's respective classification confidence values for a query image and a candidate image, respectively. $\cap(A, B)$ is a class intersection list between A and B, $\cap(A, B)$ comprises the common classes between A and B, $\cup(A, B)$ is a class union list between A and B, $\cup(A, B)$ comprises the unique classes in A and B, and $C_{argument}$ is the confidence value of one of the classes in the intersection list or the union list, wherein argument is a criterion of a minimum (min), a maximum (max), or an average (ave) confidence value of the one of the classes.

For example, A and B, shown below, are tables of scene classification model outputting confidence values of classes of a query image and a candidate image, respectively.

| A | | B | |
|---|---|---|---|
| Scene class | Confidence value | Scene class | Confidence value |
| Racecourse | 0.40460 | Racecourse | 0.74316 |
| Arena/rodeo | 0.0545 | Arena/rodeo | 0.0484 |
| Ice skating rink/outdoor | 0.0336 | Corral | 0.0183 |
| | | Stable | 0.0145 |
| Escalator/indoor | 0.0291 | Orchestra pit | 0.00958 |
| Ice skating rink/indoor | 0.0193 | | |

The class intersection list $\cap(A, B)$ comprises the common classes with the confidence value of each class, as shown in the example table $\cap(A, B)$ below:

| | $\cap^{(A,B)}$ | |
|---|---|---|
| Scene class | A: confidence value | B: confidence value |
| Racecourse | 0.40460 | 0.74316 |
| Arena/rodeo | 0.0545 | 0.0484 |

The class union list $\cup(A, B)$ comprises the unique classes with a confidence value of each class, as shown in the example table $\cup(A, B)$ below:

| | $\cup^{(A,B)}$ | |
|---|---|---|
| Scene class | A: confidence value | B: confidence value |
| Racecourse | 0.40460 | 0.74316 |
| Arena/rodeo | 0.0545 | 0.0484 |
| Ice skating rink/outdoor | 0.0336 | — |
| Escalator/indoor | 0.0291 | — |
| Ice skating rink/indoor | 0.0193 | — |
| Corral | — | 0.0183 |
| Stable | — | 0.0145 |
| Orchestra pit | — | 0.00958 |

To compute equation (1), $C_{argument}(.)$ determines the argument's criterion confidence value of each class. Example embodiments describe the argument's criterion as max, which determines a maximum confidence value of a compared class. A compared class refers to a class with a respective confidence value from column A and a respective confidence value from column B above (e.g. Racecourse with a confidence value of 0.40460 from A and a confidence value of 0.74316 from B of table $\cup(A, B)$) Example embodiments describe the argument's criterion as min, which determines a minimum confidence value of a compared class. Example embodiments describe the argument's criterion as the ave, which determines an average confidence value of a compared class.

For example, to determine $C_{argument}(\cap(A, B))$ for equation (1), where the argument is max, then the output may be as in the table below:

| Scene class | $C_{max}(\cap^{(A,B)})$ |
|---|---|
| Racecourse | 0.74316 |
| Arena/rodeo | 0.0545 |

A further example, to determine $C_{max}(\cup(A, B))$ for equation (1), then the output may be as in the table below:

| Scene class | $C_{max}(\cup^{(A,B)})$ |
|---|---|
| Racecourse | 0.74316 |
| Arena/rodeo | 0.0545 |
| Ice skating rink/outdoor | 0.0336 |
| Escalator/indoor | 0.0291 |
| Ice skating rink/indoor | 0.0193 |
| Corral | 0.0183 |
| Stable | 0.0145 |
| Orchestra pit | 0.00958 |

A value of the similarity measure of equation (1) with argument criterion of max for the abovementioned example examples may be computed, for three significant numbers, as $$\text{Similarity measure} =$$

$$\frac{0.743 + 0.054}{0.74 + 0.054 + 0.033 + 0.029 + 0.019 + 0.018 + 0.0145 + 0.009} = 0.869$$

It is to be understood that the same approach described above is applicable to an output of an attribute classification model that provides confidence values of each class. In the case of the attribute classification model, the output may be classes of attributes instead of classes of scenes. Examples of attribute classes may be stressful, funny, scary, etc.

Example embodiments describe the scene classification model and/or the attribute classification model outputting a list of classes only with no class confidence value of each class. In such embodiments, the similarity measure, scene classification similarity measure 302 or attribute classification similarity measure 304, determines similarity based on intersection over union. The similarity measure is computed as follows:

$$\text{Similarity measure} = \frac{\#\cap(A, B)}{\#\cup(A, B)} \quad (2)$$

where A and B are lists of classes in a query image and a candidate image, respectively, $\#\cap(A, B)$ is a number of classes in a class intersection list between A and B, $\cap(A, B)$ comprises the common classes between A and B, and $\#\cup(A, B)$ is a number of classes in a class union list between A and B, $\cup(A, B)$ comprises unique classes in A and B.

For example, if A and B are lists of classes of a query image and a candidate image, respectively. These lists of classes are an output of an attribute classification model outputting a list of classes. List A: {stressful, scary, man-made, natural light, cold, open area, no horizon, cloth, metal, competing}. List B: {stressful, open area, natural light, dry, enclosed area, no horizon, man-made, cloth, working, spectating}.

The number of common classes between lists A and B, $\#\cap(A, B)$ is 6, which are {stressful, man-made, natural light, open area, no horizon, cloth}. Further, the number of unique classes between lists A and B, $\#\cup(A, B)$, is 14, which are {stressful, scary, man-made, natural light, cold, open area, no horizon, cloth, metal, competing, dry, enclosed area, working, spectating}. Consequently, the similarity measure between the query image and the candidate image of the above-explained examples, following equation (2), may be computed as $$\text{Similarity measure} = \frac{6}{14} = 0.428$$

The example embodiments above describe the output of an attribute classification model with outputs of attribute classes. It is to be understood that the same approach is applicable to an output of a scene classification model that provides a list of classes. In the case of the scene classification model, the output may be of scene classes instead of attribute classes, such scene classes may be racecourse, arena/rodeo, shopping mall, etc.

The scene classification similarity measure 302 and/or the attribute classification similarity measure 304 computes a similarity measure between a query image and each candidate image of the candidate images and may assign the similarity measure value to each candidate image. The scene classification similarity measure 302 and/or the attribute classification similarity measure 304 computes a similarity measure as in equation (1) or (2), depending on whether the respective classification unit (222 or 224) outputs a list of classes with confidence values or a list of classes only, respectively.

The object detection unit 226 may be used to perform object detection (e.g., object localization and classification). It receives a query image and candidate images and detects objects in all images. A trained machine learning model may be used to perform the object detection task. In example embodiments, the object detection model is learned based on deep learning and trained on large-scale datasets. The output of the object detection unit is a list of object labels and the location of each object. Example embodiments describe the location of an object as a mask represented by a set of pixel locations of the detected object. Example embodiments describe the location of an object as a bounding box represented by a set of coordinates to represent the location of the object.

The object detection unit 226 also computes the relative area of each object is as follows:

$$\text{Relative Area}_{object} = \frac{\text{Area of object}}{\text{Area of image}} \quad (3)$$

where an Area of object is a number of pixels occupied by the object, and an Area of image is a number of pixels of the image comprising the object, in other words, the size of the image where the object is detected in by the object detection unit 226. The object detection similarity measure 306 determines the similarity between a query image and a candidate image. The object detection similarity measure 306 receives the list of object labels and the relative area of each object.

The object detection similarity measure 306 determines the similarity between a query image and a candidate image. The object detection similarity measure 306 receives the list of object labels and the relative area of each object then computes the area-weighted intersection over union as follows:

$$\text{Similarity measure} = \frac{\sum_{object\ label \in \cap(A,B)} R_{argument}(\cap(A, B))}{\sum_{object\ label \in \cup(A,B)} R_{max}(\cup(A, B))} \quad (4)$$

For example, A and B, shown below, are tables of object detection model output comprising object labels and a relative area of each object label computed as in equation (4) for a query image and a candidate image, respectively.

| A | | B | |
|---|---|---|---|
| Object | Relative area | Object | Relative area |
| Person | 0.3 | Frisbee | 0.1 |
| Frisbee | 0.001 | Person | 0.36 |
| Person | 0.01 | Person | 0.35 |
| Person | 0.2 | | |

Equation (1) and equation (4) are computed differently. The output of the scene classification model and the output of attribute classification model, which are used when computing equation (1), comprise classes occurring once in an image. However, the output of the object detection model, which is used when computing equation (4), comprises object labels where each label may occur more than once in an image. For instance, the object label of Person in tables A and B above. An image may have two persons, i.e. two object labels of Person. Example embodiments compute the intersection of labels between A and B, ∩(A, B), by considering each object label and sort the considered object label based on the area values of the considered object label.

For example, table A and B above comprises object labels Frisbee and Person. While considering each object label, the object detection similarity measure 306 sorts each object label based on the relative area values of the considered object label. This example demonstrates the sorting performed in descending order. Other example embodiments may sort object labels in ascending order. Other example embodiments may use a different sorting method. The aforementioned operation of considering each object label and sorting each considered object label is illustrated in the tables below.

| Object | Relative area | Object | Relative area |
|---|---|---|---|
|  | A (Frisbee) |  | B (Frisbee) |
| Frisbee | 0.001 | Frisbee | 0.1 |
|  | A (Person) |  | B (Person) |
| Person | 0.3 | Person | 0.36 |
| Person | 0.2 | Person | 0.35 |
| Person | 0.01 |  |  |

In order to compute the similarity measure in equation (4), $R_{argument}(.)$ determines the argument's criterion relative area value of a pair of object labels. Example embodiments describe the argument's criterion as max, which determines a maximum relative area of a pair of object labels. Example embodiments describe the argument's criterion as min, which determines a minimum relative area of a pair of object labels. Example embodiments describe the argument's criterion as aye, which determines an average relative area of pair of object labels. A pair of object labels refers to an object label in both tables A and B that have the same rank (e.g. Person with a relative area of 0.3 in table A and Person with a relative area of 0.36 in table B above).

For example, for the Person object label, if the argument's criterion is max, then the $R_{argument}(.)$ considers:

A first pair of object labels, Person with a relative area of 0.3 in table A with Person with a relative area of 0.36 from table B, and outputs $R_{argument}(0.3, 0.36) = 0.36$, for argument max.

A second pair of object labels, Person with a relative area of 0.2 in table A with Person with a relative area of 0.35 in table B, and outputs $R_{argument}(0.2, 0.35) = 0.35$, for argument max.

In example embodiments related to the above example, if the argument criterion is min, the $R_{argument}(0.3, 0.36) = 0.3$ for the first pair, and $R_{argument}(0.2, 0.35) = 0.2$, for the second pair.

Example embodiments describe $R_{argument}(\cap(A, B))$ is computed by excluding the object labels that are not part of a pair, for instance, excluding object label Person in table A with a relative area of 0.01. Example embodiments describe $R_{argument}(\cup(A, B))$ is computed by including the labels that are not part of a pair, for instance, including object label Person in table A with a relative area of 0.01.

Equation (4) may be computed for the example in tables A and B above with argument criterion min as $$\text{similarity measure} = \frac{0.2 + 0.3 + 0.01}{0.35 + .36 + 0.1 + 0.01} = 0.621$$

where the relative area value of 0.01 in the numerator is for the object label Frisbee.

Example embodiments describe object detection similarity measure 306 computing the similarity between a query image and a candidate image using intersection over union as in equation (2) above, for object labels instead of classes. Example embodiments describe computing #∩(A, B) by excluding the labels that are not part of a pair. Example embodiments describe computing #∪(A, B) by including the labels that are part of a pair.

For example, if object label list A comprises {Frisbee, Person, Person, Person}, and object label list B comprises {Person, Person, Frisbee}, then the pairs may be illustrated as:

| A | Frisbee | Person | Person | Person |
|---|---|---|---|---|
| B | Frisbee | Person | Person |  |

The output of #∩(A, B) may be 3 computed as in equation (2) as follows. A Frisbee object label in list A is paired with a Frisbee object label in list B, a first Person object label in list A is paired with a first Person object label in list B, and a second Person object label in list A is paired with a second Person object label in list B. A third Person object label in list A is not paired with a third person object label B; therefore, it is excluded in the computation of #∩(A, B).

The image statistics unit 228 may be used to perform statistics on images. The image statistics unit 228 receives images, comprising a query image and candidate images, transforms, using an image statistics model, each image into a domain and computes statistics between the query image and each candidate image. Example embodiments describe the image statistics model being a trained machine learning model. Example embodiments describe the image statistic model being a mathematical function. Example embodiments describe the image statistic being learned based on deep learning and trained on large-scale datasets. Example embodiments describe the image statistics model using the pixel values of each image as the domain of the image. Other example embodiments describe the image statistics model transforms an image to a feature domain such as Haar-like feature, Local Binary Patterns, Histogram of Oriented Gradients, and the like. Example embodiments describe the image statistics model transforming the image into a fixed-length vector domain using maximum, minimum, or average pool.

The image statistics similarity measure 308 uses at least one or a combination of the domains abovementioned to compute similarity between the query image and each candidate image using one or a combination of measurements comprising $L_0$, $L_1$, or $L_2$ distances, hamming distance, cosine similarity, and the like. The $L_0$ distance computes the number of nonzero pixel values in the query image and each candidate image. The $L_1$ distance computes the sum of the magnitudes between pixel values of the query image and the respective pixel values of each candidate image. In other words, the $L_1$ distance computes the sum of the absolute difference between pixel values of the query image and the respective pixel values of each candidate image. The $L_2$ distance is the Euclidean distance between pixel values of the query image and the respective pixel values of each candidate image. In other words, the $L_2$ distance is the square root of the sum of the squared differences between pixel values of the query image and the respective pixel values of each candidate image.

Each of scene classification similarity measure 302, attribute classification similarity measure 304, objection detection similarity measure 306, and image statistics similarity measure 308 assigns computed similarity measure to each candidate image.

Ranking unit 310 receives a list comprising at least one similarity measure computed by the similarity measure 302, 304, 306, or 308 and ranks the candidate images based on the one or more similarity measures. The ranking unit 310 is predefined by a user as to which similarity measures to use to rank the candidate images. Example embodiments describe the ranking unit 310 ranking the candidate images in stages. For instance, the ranking unit 310 calculates a similarity agglomerate index (also referred to as index) as a combination of the output (similarity measure) of the scene classification similarity measure 302 and the attribute classification similarity measure 304. The ranking unit 310 may use the similarity agglomerate index to rank the candidate images. Further, the ranking unit 310 may re-rank a subset of the ranked candidate images based on the output of the object detection similarity measure 306 and/or image statistics similarity measure 308.

In example embodiment, the ranking unit 310 may use the similarity agglomerate index to rank the candidate images and generate a first ranked candidate images. Further, the ranking unit 310 may re-rank a subset of the first ranked candidate images based on the output of the object detection similarity measure 306 to generate a second ranked candidate images. Further, the ranking unit 310 may re-rank the subset of the second ranked candidate images to generate a final ranked candidate images based on the output of the image statistics similarity measure 308.

The subset of the first ranked candidate images corresponds to candidate images with a similarity agglomerate index above a first predefined threshold. The subset of the second ranked candidate images corresponds to candidate images of the first ranked candidate images with an object detection similarity measure 306 above a second predefined threshold.

Example embodiments describe the ranking unit 310 using a weighted aggregate of one or more similarity measures (302, 306, 308, and 310) to compute the similarity agglomerate index. For instance, if the similarity measure output of the scene classification similarity measure 302, computed as in equation (1), is denoted sim_meas1(.), and the similarity measure output of the attribute classification similarity measure 304, computed as in equation (2), is denoted sim_meas2(.), then the similarity agglomerate index may be computed as $$\text{Index}(A,B,\lambda) = \lambda \text{ sim\_meas1}(A_1,B_1) + (1-\lambda)\text{sim\_meas2}(A_2,B_2) \quad (5)$$

where A and B are a query image and a candidate image, $\lambda$ is a weight of a value of less than 1, $A_1$ and $B_1$ are the outputs of the scene classification model for the query image and the candidate image, respectively, and $A_2$ and $B_2$ are the outputs of the attribute classification model for the query image and the candidate image, respectively.

Instead of considering the pixel values of the query and candidate images, example embodiments describe the image statistics measure using the histogram domain of the images with at least one of the aforementioned measures. Example embodiments describe the image statistics model transforming the images to a feature domain, then the image statistic measure computes the aforementioned measurements (e.g. $L_0$, $L_1$, or $L_2$ distances, hamming distance, cosine similarity, and the like.) between the transformed query image and each transformed candidate image in the feature domain. Feature domains may include Haar-like features, Local Binary Pattern features, Histogram of Oriented Gradients, and the like.

Figure 4:
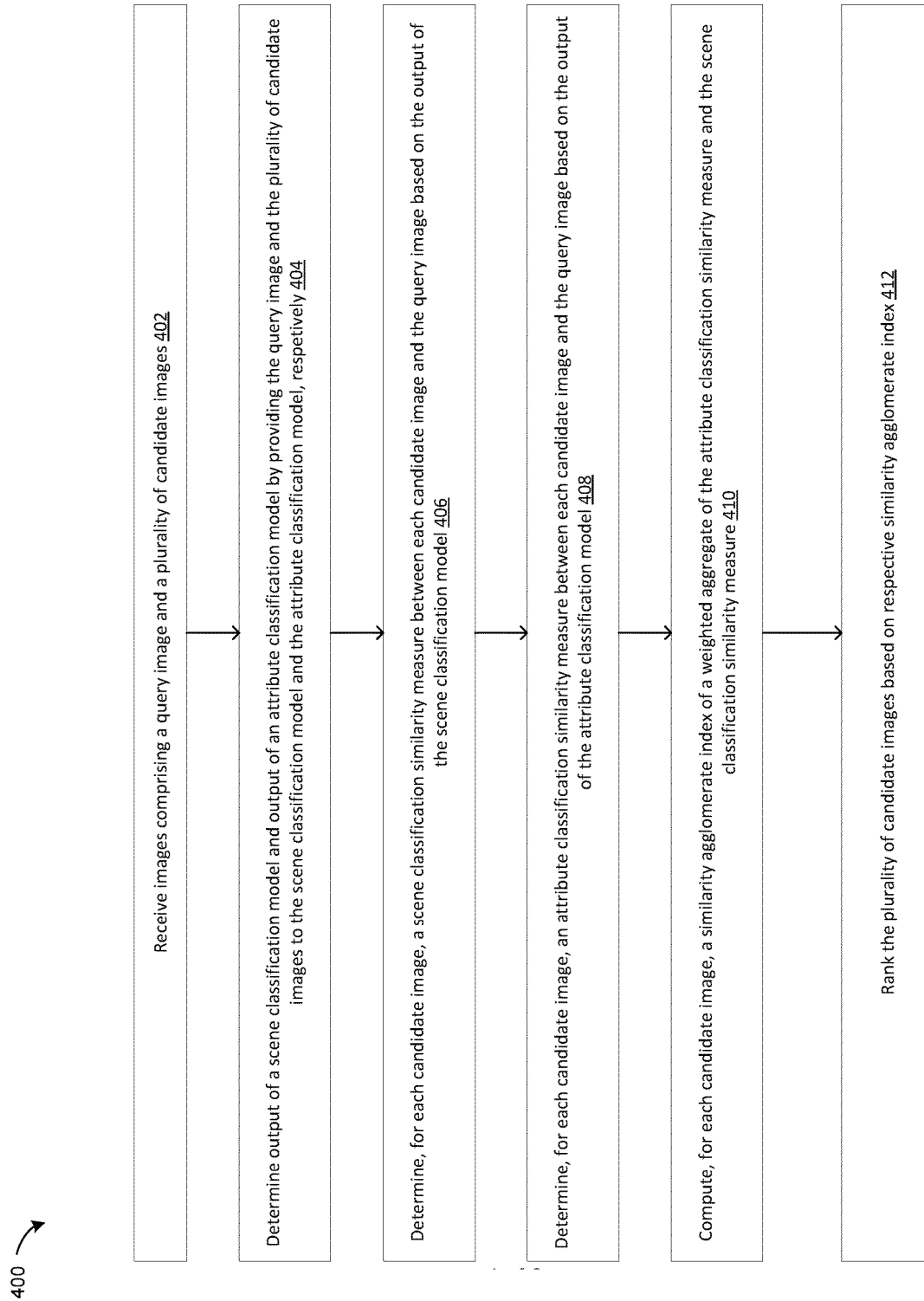
FIG. 4 is a flowchart of an example method for image searching in accordance with an example embodiment of the present application.

FIG. 4 is a flowchart of an example method for image searching. The method 400 for image searching receives images comprising a query image and a plurality of candidate images 402. The method 400 determines output of two models, a scene classification model and an attribute classification model by providing the query image and the plurality of candidate images to the scene classification model and the attribute classification model, respectively 404. Further, the method 400 determines similarity measures between the query image and each candidate image of the plurality of candidate images. For each candidate image, a first similarity measure is based on a scene classification similarity measure 406 computed as in equation (1) or (2). Equation (1) is used if the output of the scene classification model comprises a list of classes and confidence values, and equation (2) is used if the output of the scene classification model comprises a list of classes only. The method 400, further, determines, for each candidate image, a second similarity measure based on an attribute classification similarity measure 408 computed as in equation (1) or (2), depending on the output of the attribute classification model.

The method 400 computes, for each candidate image, a similarity agglomerate index of a weighted aggregate of the attribute classification measure and the scene classification similarity measure, computed as in equation (5) 410. Each candidate image of the plurality of candidate images is ranked based on the value of the respective similarity agglomerative index.

Figure 5:
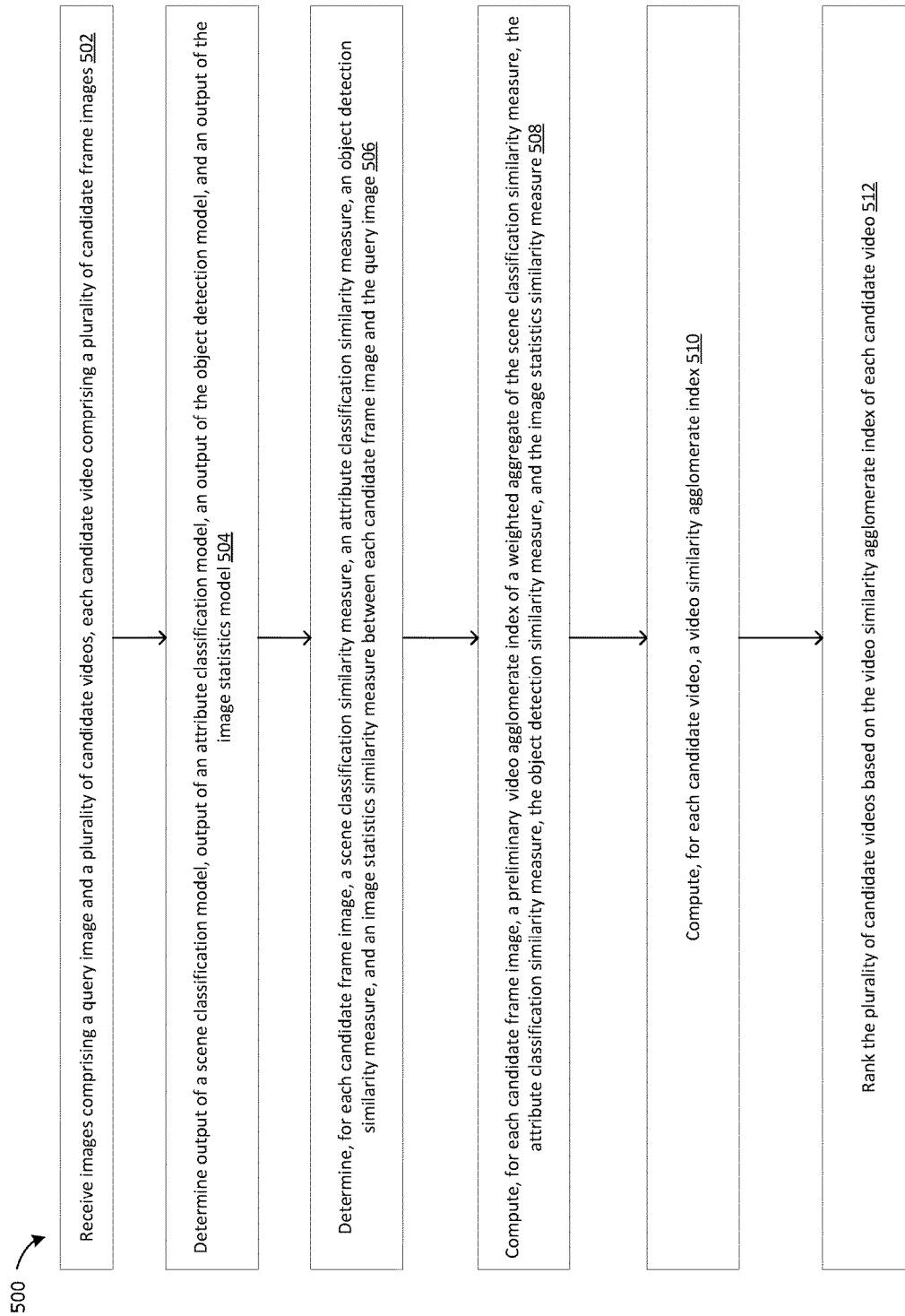
FIG. 5 is a flowchart of a method for video searching based on a query image in accordance with an example embodiment of the present application.

FIG. 5 is a flowchart of a method for video searching for a query image. Example embodiments describe the image searching system 220 applied to rank candidate videos instead of candidate images. Each candidate video is a plurality of candidate images. The method 500 computes similarity measures between a query image and a plurality of videos. The method 500 receives images comprising a query image and a plurality of candidate videos; each candidate video comprises a plurality of candidate frame images 502. At step 504, the method 500 determines an output of a scene classification model, an output of an attribute classification model, an output of the object detection model, and an output of the image statistics model. At step 506, for each candidate frame image, the method 500 determines a model's respective similarity measure between each candidate frame image and the query image. The method 500 then proceeds to step 508.

At step 508, the method 500, computes for each candidate frame image a preliminary video similarity agglomerate index of a weighted aggregate of the scene classification similarity measure, attribute classification similarity measure, object detection similarity measure, and image statistics similarity measure. At step 510, a video similarity agglomerate index is computed for each candidate video based on the preliminary video similarity agglomerate index of each candidate video frame images. The video similarity agglomerate index of a candidate video may be the average value of the preliminary video similarity agglomerate indexes of the candidate video frame images. It is to be understood that other measures may be computed to generate the video similarity agglomerate index such as the median, maximum, or minimum value of the preliminary video similarity agglomerate indexes of each candidate video frame images. At step 512, the method 500 ranks the plurality of candidate videos based on respective video similarity agglomerate index.

Figure 6:
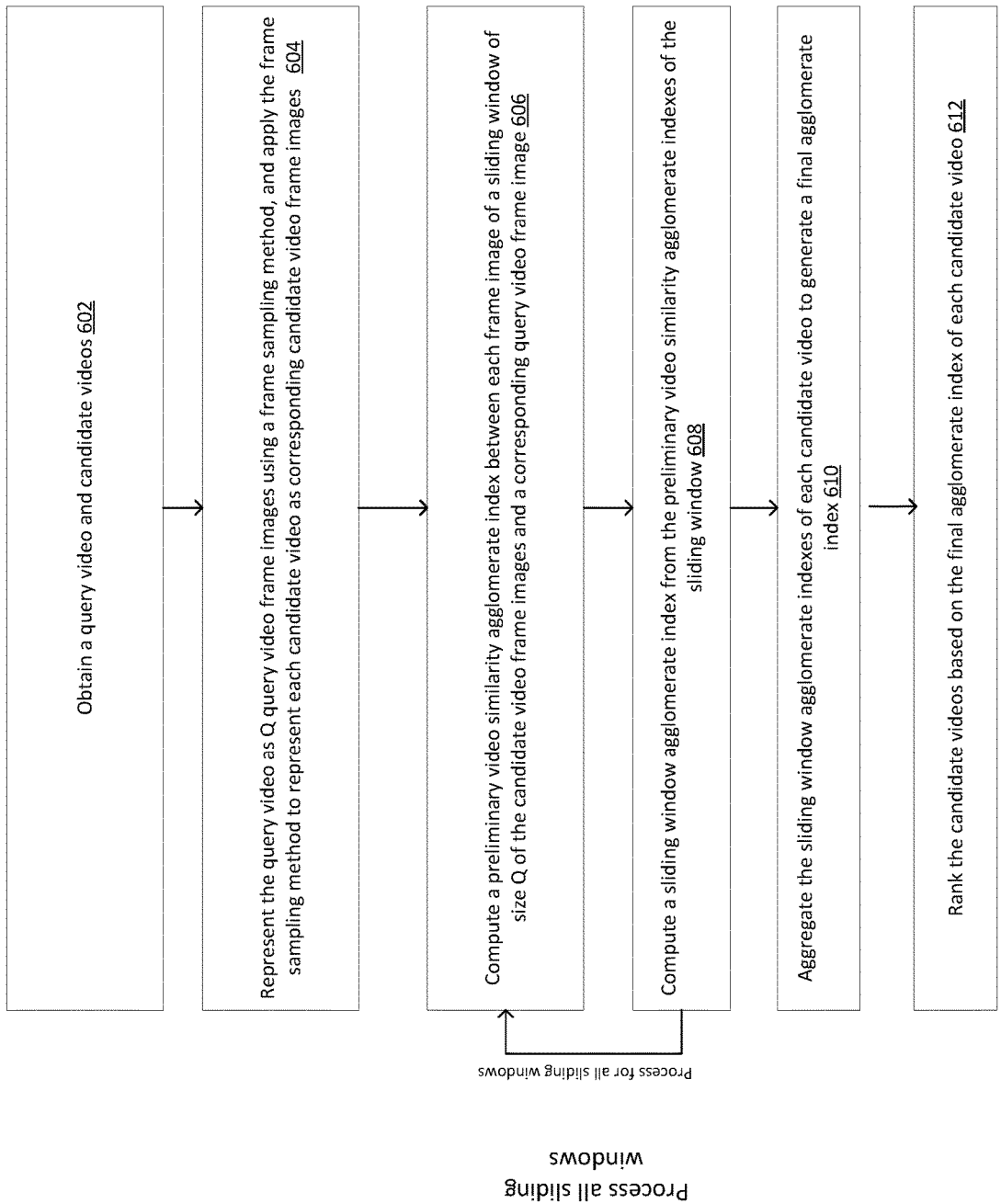
FIG. 6 is a flowchart of a method for video searching based on a query video in accordance with an example embodiment of the present application.

FIG. 6 is a flowchart of a method 600 for video searching based on a query video. The method 600 begins at step 602 at which the method 600 obtains a query video and candidate videos. At step 604, the query video is represented by a number of Q query video frame images using a frame sampling method, Q being an integer number. The frame sampling method may be any known frame sampling method, such as continuous framing sampling, skip-frame sampling, or salient frame identification, that are capable of receiving a video as input and outputting frame images representing the video. At this step, a user provides the number of Q frames to be outputted for the query video. The same sampling method used to output the Q frames is used to represent each candidate video with corresponding candidate video frame images. In example embodiments, Q, the number of frames of the query video, is less than or equal to C, the number of frames of a candidate video. In some example embodiments of method 600, the frame sampling method decides on Q rather than the user. The method 600 proceeds to step 606.

At step 606, the method 600 processes, after loading into memory 210, a sliding window of Q consecutive frames of the candidate video frame images. For the sliding window, the method 600 computes a preliminary video similarity agglomerate index between each frame image of the sliding window and a corresponding query video frame image. The preliminary video similarity agglomerate index is computed as described above in FIG. 5. The method 600 then proceeds to step 608.

At step 608, the method computes a sliding window agglomerate index for the sliding window being processed. The preliminary video similarity agglomerate indexes for the candidate video frame images of the sliding window are averaged to generate a sliding window agglomerate index. Hence, the sliding window agglomerate index measures the similarity between the query video frame images and the sliding window of the candidate video frame images. The method 600 then processes another sliding window by advancing one frame of the C candidate video frames. In other words, the method 600 removes the first frame image of the sliding window from the memory and loads a frame image from the video candidate image to the end of the processed sliding window.

In example embodiments of method 600, at step 608, the sliding window agglomerate index is computed by computing the maximum, minimum, or median of the preliminary video similarity agglomerate indexes of the candidate video frame images of the sliding window.

The method 600 computes the sliding window agglomerate index for all sliding windows of all candidate videos. The method 600 then proceeds to step 610. At step 610, the method 600 aggregates the sliding window agglomerate indexes of each candidate video to generate a final agglomerate index. In this embodiment, the method 600 averages the sliding window agglomerate indexes of each candidate images however other example embodiments may use minimum, maximum, or median operation to compute the final agglomerate index of each candidate video. The method 600 proceed to step 612. At step 612, the method 600 ranks the candidate videos based on the final agglomerate index of each candidate video.

In example embodiments, the method 600 does not proceed to step 612, instead the method 600 ranks the sliding windows of all candidate videos based on respective sliding window agglomerate index to search for similar sliding windows of candidate videos instead of candidate videos.

The disclosed methods for image searching 400, video searching for query image 500, and video searching for query video 600 may be carried out by modules, routines, or subroutines of software executed by the processing system 200. Coding of software for carrying out the steps of the methods is well within the scope of a person of ordinary skill in the art having regard to the methods of image searching 400 and video searching 500 and 600. The image searching method 400 and the video searching methods 500 and 600 may contain additional or fewer steps than shown and described, and the steps may be performed in a different order. Computer-readable instructions, executable by the processor(s) of the processing system 200, may be stored in the memory 210 of the processing system 200 or a computer-readable medium. It is to be emphasized that the steps of the methods for image searching and video searching need not be performed in the exact sequence as shown unless otherwise indicated; and likewise, various steps of the methods may be performed in parallel rather than in sequence.

It can be appreciated that the image searching method and the video searching method of the present disclosure, once implemented, can be performed by the processing system 200 in a fully-automatic manner, which is convenient for users to use as no manual interaction is needed.

It should be understood by a person skilled in the art that, for the purpose of convenient and brief description, for a detailed working process of the foregoing system, apparatus, and unit, refer to a corresponding process in the foregoing method embodiments, and details are not described herein again.

In the several embodiments described, it should be understood that the disclosed systems and methods may be implemented in other manners. For example, the described system embodiments are merely examples. Further, units or components may be combined or integrated into another system, or some features may be ignored or not performed. In addition, the displayed or discussed mutual couplings or direct couplings or communication connections may be implemented by using some interfaces. The indirect couplings or communication connections between the systems or units may be implemented in electronic, mechanical, or other forms.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed for image searching and video searching and shown herein may comprise a specific number of elements/components, the systems, devices, and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the example embodiments may be integrated into one processing system 200, or each of the units may exist alone physically, or two or more units are integrated into one unit.

When the functions are implemented in the form of a software functional unit and sold or used as an independent product, they may be stored in a storage medium and include several instructions for instructing a computer device (which may be a personal computer, a server, or a network device) to perform all or some of the steps of the methods described in the embodiments of this application. The foregoing storage medium includes any medium that can store program code, such as a universal serial bus (USB) flash drive, a removable hard disk, a read-only memory (ROM), a random access memory (RAM), a magnetic disk, or an optical disc, among others.

The foregoing descriptions are merely specific implementations but are not intended to limit the scope of protection. Any variation or replacement readily figured out by a person skilled in the art within the technical scope shall fall within the scope of protection. Therefore, the scope of protection shall be subject to the protection scope of the claims.

The invention claimed is:

1. A method for image searching for images comprising at least one query image and a plurality of candidate images by ranking the plurality of candidate images based on similarity to the at least one query image, the method comprising:
   determining, for each candidate image of the plurality of candidate images, a first model similarity measure from an output of a first model configured for scene classification to perceive scenes in the images, wherein the first model similarity measure is measured between each candidate image and the at least one query image;
   determining, for each candidate image of the plurality of candidate images, a second model similarity measure from the output of a second model configured for attribute classification to perceive attributes in the images, wherein the second model similarity measure is measured between each candidate image and the at least one query image;
   obtaining, for each candidate image of the plurality of candidate images, a similarity agglomerate index of a weighted aggregate of the first model similarity measure and the second model similarity measure;
   ranking the plurality of candidate images based on the respective similarity agglomerate index of each candidate image and generating a first ranked candidate images corresponding to the searched images;
   determining, for each candidate image of a subset of the first ranked candidate images, a third model similarity measure from the output of a third model configured for object detection, wherein the third model similarity measure is measured between each candidate image of the subset of the first ranked candidate images and the at least one query image;
   ranking the subset of the first ranked candidate images based on the respective third model similarity measure of each candidate image of the subset of the first ranked candidate images and generating a second ranked candidate images corresponding to the searched images;
   determining, for each candidate image of a subset of the second ranked candidate images, a fourth model similarity measure from the output of a fourth model configured for computing image statistics, wherein the fourth model similarity measure is measured between each candidate image of the subset of the second ranked candidate images and the at least one query image; and
   ranking the subset of the second ranked candidate images based on the respective fourth model similarity measure and generating a final ranked candidate images corresponding to the searched images.

2. The method of claim 1, wherein the fourth model is configured for computing the image statistics between the at least one query image and each candidate image of the subset of second ranked candidate images by:
   transforming the at least one query image and each candidate image of the subset of the second ranked candidate images into at least one of a fixed length vector, histogram, and pixel values to generate at least one transformed query image and transformed candidate images; and
   obtaining at least one of cosine similarity, hamming distance, $L_0$ distance, $L_1$ distance, and $L_2$ distance between the at least one transformed query image and each transformed candidate images.

3. The method of claim 1, wherein the first model or the second model generates a classification confidence value for each class in the images, the first model similarity measure or the second model similarity measure being determined by the following equation $$\text{Similarity measure} = \frac{\sum_{class \in \cap(A,B)} C_{argument}(\cap(A, B))}{\sum_{class \in \cup(A,B)} C_{max}(\cup(A, B))}$$

where A and B are lists of the classes with respective classification confidence values in the at least one query image and each candidate image, respectively, ∩(A, B) is a class intersection list between A and B, ∩(A, B) comprising common classes between A and B, ∪(A, B) is a class union list between A and B, ∪(A, B) comprising unique classes of A and B, and $C_{argument}$ is the confidence value of one of the classes in the intersection list or the union list, wherein argument is a criterion of a minimum (min), a maximum (max), or an average (ave) confidence value of the one of the classes.

4. The method of claim 1, wherein the first model or the second model generates a list of classes in the images, the first model similarity measure or the second model similarity measure being determined as in the following equation $$\text{Similarity measure} = \frac{\# \cap (A, B)}{\# \cup (A, B)}$$

where A and B are lists of classes in the at least one query image and each candidate image, respectively, #∩(A, B) is a number of classes in a class intersection list between A and B, #∩(A, B) comprising common classes between A and B, and #∪(A, B) is a number of classes in a class union list between A and 8, #∪(A, B) comprising unique classes in A and B.

5. The method of claim 1, wherein the third model configured for object detection comprises:

detecting objects in the image;
generating, for each object, an object label and a location;
obtaining, for each object, a relative area measurement as in the following equation $$\text{Relative Area}_{object} = \frac{\text{Area of object}}{\text{Area of image}}$$

where Area of object is a number of pixels represented by each object, and Area of image is a number of pixels of the image the object is detected in; and
determining the third model similarity measure as in the following equation $$\text{Third model similarity measure} = \frac{\sum_{object\ label \in \cap(A,B)} R_{argument}(\cap(A,B))}{\sum_{object\ label \in \cup(A,B)} R_{max}(\cup(A,B))}$$

where A and B are lists of object labels with respective relative area values in the at least one query image and each candidate image of the subset of the first ranked candidate images, respectively, ∩(A, B) is an object label intersection list between A and B, ∩(A, B) comprising common object labels between A and B, ∪(A, B) is an object label union list between A and B, ∪(A, B) comprising unique object labels in A and B, $R_{argument}$ is the relative area values of one of object labels in the object label intersection list or the object label union list, wherein argument is a criterion of a minimum (min), a maximum (max), and an average (ave) relative area value of the one of object labels.

6. The method of claim 5, when A or B has more than one object of the one of object labels in the object label intersection list or object label union list, $R_{argument}$ is computed by:
   determining $R_{argument}$ for every pair of the one of object labels in A and B, the pair being the one of object label in A and the one of object label in B;
   including the relative area values of the one object label in A or B with no respective pair if $R_{argument}$ is computed for ∪(A, B); and
   excluding the relative area values of the one object label A or B with no respective pair if $R_{argument}$ is computed for ∩(A, B).

7. The method of claim 6, wherein computing $R_{argument}$ further comprises:
   sorting the one of the object labels in A and B based on relative area values; and
   ranking the one of the object labels in the sorted A and B.

8. The method of claim 5, wherein the location of each object is represented by a mask or a bounding box.

9. A system for image searching for images comprising at least one query image and a plurality of candidate images by ranking the plurality of candidate images based on similarity to the at least one query image, the system comprising:
   a non-transitory memory storing instructions;
   a processor coupled to the memory and configured to execute the instructions to:
      determine, for each candidate image of the plurality of candidate images, a first model similarity measure from an output of a first model configured for scene classification to perceive scenes in the images, wherein the first model similarity measure is measured between each candidate image and the at least one query image;
      determine, for each candidate image of the plurality of candidate images, a second model similarity measure from the output of a second model configured for attribute classification to perceive attributes in the images, wherein the second model similarity measure is measured between each candidate image and the at least one query image;
      obtain, for each candidate image of the plurality of candidate images, a similarity agglomerate index of a weighted aggregate of the first model similarity measure and the second model similarity measure;
      rank the plurality of candidate images based on the respective similarity agglomerate index of each candidate image and generating a first ranked candidate images corresponding to the searched images;
      determine, for each candidate image of a subset of the first ranked candidate images, a third model similarity measure from the output of a third model configured for object detection, wherein the third model similarity measure is measured between each candidate image of the subset of the first ranked candidate images and the at least one query image;
      rank the subset of the first ranked candidate images based on the respective third model similarity measure of each candidate image of the subset of the first ranked candidate images and generating a second ranked candidate images corresponding to the searched images;
      determine, for each candidate image of a subset of the second ranked candidate images, a fourth model similarity measure from the output of a fourth model configured for computing image statistics, wherein the fourth model similarity measure is measured between each candidate image of the subset of the second ranked candidate images and the at least one query image; and
      rank the subset of the second ranked candidate images based on the respective fourth model similarity measure and generating a final ranked candidate images corresponding to the searched images.

10. The system of claim 9, wherein the fourth model is configured for computing the image statistics between the at least one query image and each candidate image of the subset of second ranked candidate images by:
    transforming the at least one query image and each candidate image of the subset of the second ranked candidate images into at least one of a fixed length vector, histogram, and pixel values to generate at least one transformed query image and transformed candidate images; and
    obtaining at least one of cosine similarity, hamming distance, $L_0$ distance, $L_1$ distance, and $L_2$ distance between the at least one transformed query image and each transformed candidate images.

11. The system of claim 9, wherein the first model or the second model generates a classification confidence value for each class in the images, the first model similarity measure or the second model similarity measure being determined by the following equation $$\text{Similarity measure} = \frac{\sum_{class \in \cap(A,B)} C_{argument}(\cap(A,B))}{\sum_{class \in \cup(A,B)} C_{max}(\cup(A,B))}$$

where A and B are lists of the classes with respective classification confidence values in the at least one query image and each candidate image, respectively, ∩(A, B) is a class intersection list between A and B, ∩(A, B) comprising common classes between A and B, ∪(A, B) is a class union list between A and B, ∪(A, B) comprising unique classes of A and B, and $C_{argument}$ is the confidence value of one of the classes in the intersection list or the union list, wherein argument is a criterion of a minimum (min), a maximum (max), or an average (ave) confidence value of the one of the classes.

12. The system of claim 9, wherein the first model or the second model generates a list of classes in the images, the first model similarity measure or the second model similarity measure being determined as in the following equation $$\text{Similarity measure} = \frac{\#\cap(A, B)}{\#\cup(A, B)}$$

where A and B are lists of classes in the at least one query image and each candidate image, respectively, #∩(A, B) is a number of classes in a class intersection list between A and B, #∩(A, B) comprising common classes between A and B, and #(A, B) is a number of classes in a class union list between A and B, #∪(A, B) comprising unique classes in A and B.

13. The system of claim 9, wherein the third model configured for object detection comprises:
  detecting objects in the image;
  generating, for each object, an object label and a location;
  obtaining, for each object, a relative area measurement as in the following equation $$\text{Relative Area}_{object} = \frac{\text{Area of object}}{\text{Area of image}}$$

where Area of object is a number of pixels represented by each object, and Area of image is a number of pixels of the image the object is detected in; and determining the third model similarity measure as in the following equation $$\text{Third model similarity measure} = \frac{\sum_{object\ label \in \cap(A,B)} R_{argument}(\cap(A, B))}{\sum_{object\ label \in \cup(A,B)} R_{max}(\cup(A, B))}$$

where A and B are lists of object labels with respective relative area values in the at least one query image and each candidate image of the subset of the first ranked candidate images, respectively, ∩(A, B) is an object label intersection list between A and B, ∩(A, B) comprising common object labels between A and B, ∪(A, B) is an object label union list between A and B, ∪(A, B) comprising unique object labels in A and B, $R_{argument}$ is the relative area values of one of object labels in the object label intersection list or the object label union list, wherein argument is a criterion of a minimum (min), a maximum (max), and an average (ave) relative area value of the one of object labels.

14. The system of claim 13, when A or B has more than one object of the one of object labels in the object label intersection list or object label union list, $R_{argument}$ is computed by:
  determining $R_{argument}$ for every pair of the one of object labels in A and B, the pair being the one of object label in A and the one of object label in B;
  including the relative area values of the one object label in A or B with no respective pair if $R_{argument}$ is computed for ∪(A, B); and
  excluding the relative area values of the one object label A or B with no respective pair if $R_{argument}$ is computed for ∩(A, B).

15. The system of claim 14, wherein computing $R_{argument}$ further comprises:
  sorting the one of the object labels in A and B based on relative area values; and
  ranking the one of the object labels in the sorted A and B.

* * * * *